Sept. 26, 1950 G. V. FARNHAM 2,523,361
FISHING POLE ACCESSORY
Filed Oct. 3, 1945
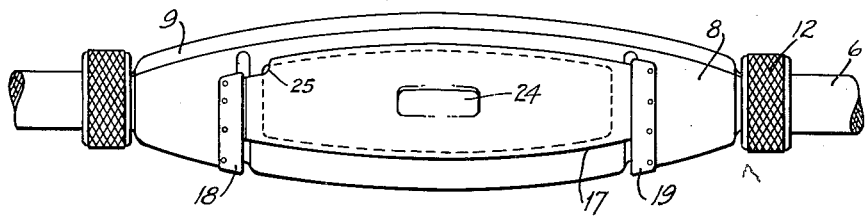
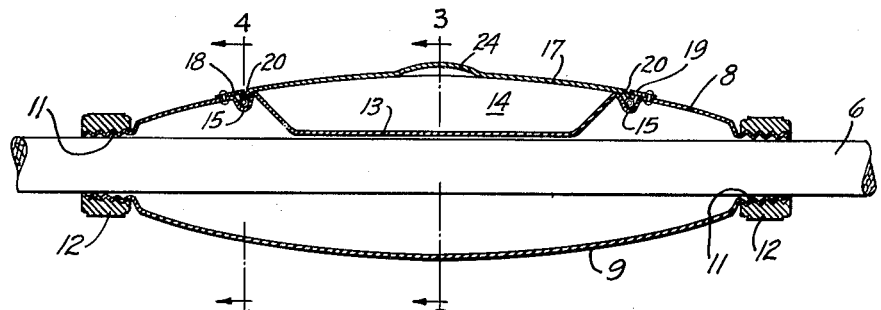
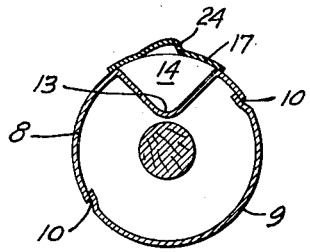
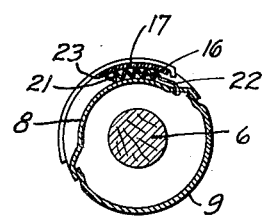
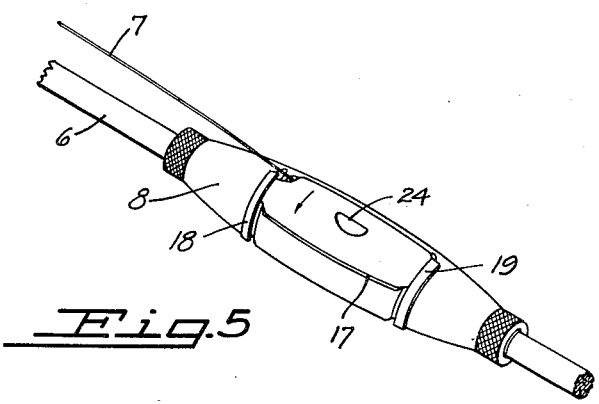
INVENTOR
GLEN V. FARNHAM
BY Edward C. Healy
ATTORNEY Patented Sept. 26, 1950

2,523,361

UNITED STATES PATENT OFFICE 2,523,361

FISHING POLE ACCESSORY

Glen V. Farnham, San Francisco, Calif.

Application October 3, 1945, Serial No. 619,927

1 Claim. (Cl. 43—25.2)

This invention relates to improvements in attachments for fishing poles and has particular reference to a housing secured to the pole, whereby a fish hook, fly, spinner or other lures may be readily positioned within the housing to thus retain the hook therein, when the pole is not in use, to prevent the hook from snagging or catching on extraneous objects.

The principal object of the invention is the provision of an economically constructed fish hook retaining housing that can either be built in the pole or can be made as a fishing accessory that can be purchased by anglers as a separate fishing unit and detachably secured to the conventional fishing pole.

A further object of the invention is the provision of a spring controlled sliding door embodied in the upper portion of the housing, that can be quickly and easily manipulated to shield and protect the hook when the pole is not in use or to readily release the hook for the desired fishing purpose.

An additional object of the invention is the provision of a device of the character described that is simple in construction, economical to manufacture, positive in operation, strong, durable, and highly efficient and serviceable in use.

Other objects and advantages will be apparent during the course of the following description.

In the accompanying drawing forming a part of this specification and in which like numerals are employed to designate like parts throughout the same, Fig. 1 is a top plan view of the device constructed in accordance with my invention, Fig. 2 is a longitudinal section through the same, the fishing pole being shown in elevation, Fig. 3 is a transverse vertical section through the housing and pole, the view being taken on the line 3—3 of Fig. 2, Fig. 4 is a transverse vertical section through the housing the sliding door and the pole, the view being taken on the line 4—4 of Fig. 2, and Fig. 5 is a perspective view of the device shown as secured to a section of a fishing pole.

It is a well known fact that considerable annoyance is experienced by anglers when a fish hook dangling from a fishing pole invariably catches or snags on brush, trees, rocks, or other objects. And particularly is this annoyance ever present when the fisherman is preparing to fish in wooded country adjacent trout streams, and when he is walking from one spot to another when the pole is not in use, or when in driving from one fishing place to another there is the danger and inconvenience of the dangling hook contacting and catching in the clothes of the fisherman or the upholstery of the car.

To therefore provide a device whereby the fish hook can be retained in a safe shielded position until it is ready to be used, and a device that will overcome the annoyances and inconveniences above recited, I have produced the present invention.

In the accompanying drawing wherein for the purpose of illustration is shown a preferred embodiment of my invention the numeral 6 indicates a section of a fishing pole, while the numeral 7 designates a leader that is connected to the fishing line carried in a reel that is secured to the fishing pole. It is to the free end of the leader that a hook (not disclosed), is secured.

My device that is preferably positioned on the pole adjacent the reel base thereof comprises an elongated housing preferably made of metal that includes an upper wall 8 and a lower wall 9 that are suitably spot welded as at 10 to thus define a substantially circular housing medially of the device, the said walls then tapering longitudinally, as disclosed to advantage in Figs. 1 and 2. The ends of the walls are equipped with tapered threads 11, and are engaged by collars or rings 12 to thus assure a snug fitting of the housing on the pole 6.

It will be noted that the said upper wall 8 is centrally depressed as at 13 to thus provide a pocket or compartment 14 to house the fish hook, fly, spinner, or other lure that may be used. The said wall is likewise provided with oppositely disposed U-shaped bends 15 that house coiled springs 16 that function to close a sliding door 17. This door is retained in position by end guides 18 and 19 that are riveted or otherwise secured to the wall 8, which guides overlie the depressed ends 20 of the door and have frictional contact therewith.

It will be observed that each spring is equipped with hook ends 21 and 22, the hook 21 being secured near the edge 23 of the door while the hook 22 is fastened to the wall 8. Thus, when the door 17 is operated or slid by the user when he contacts the thumb catch 24 provided on the upper surface of the door, the fish hook holding compartment will be either exposed to thus enable the operator to extract or remove the hook from the device, or closed under the influence of the springs to retain the hook in said pocket in a position of safety, eliminating the danger of the hook snagging or catching on extraneous objects.

In the construction of the door a portion of the same is cut away as at 25, so that the leader 7, with the hook attached, may readily rest or pass between the wall 8 and the sliding door 17.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A fishing pole attachment comprising an elongated housing tapered longitudinally and equipped at its opposite ends with threaded extremities capable of receiving thereon internally threaded collars for threadedly engaging the threaded extremities to secure said attachment to a fishing pole, said housing including an upper and lower wall, the upper wall being depressed to form a fish hook and leader receiving compartment, a cover for said compartment, said cover having a portion thereof slotted for the passage therethrough of the leader and fish hook, and springs connected to said cover and the upper wall of said housing for controlling the movement of said cover.

GLEN V. FARNHAM.

REFERENCES CITED

The following references are of record in the file of this patent:

UNITED STATES PATENTS

| Number | Name | Date |
| --- | --- | --- |
| 870,477 | Snyder | Nov. 5, 1907 |
| 886,337 | Balken | May 5, 1908 |
| 1,076,542 | Balch | Oct. 21, 1913 |
| 1,216,069 | Cammack | Feb. 13, 1917 |
| 1,920,478 | Norton | Aug. 1, 1933 |
| 2,285,888 | Benton | June 9, 1942 |